Figure 5:
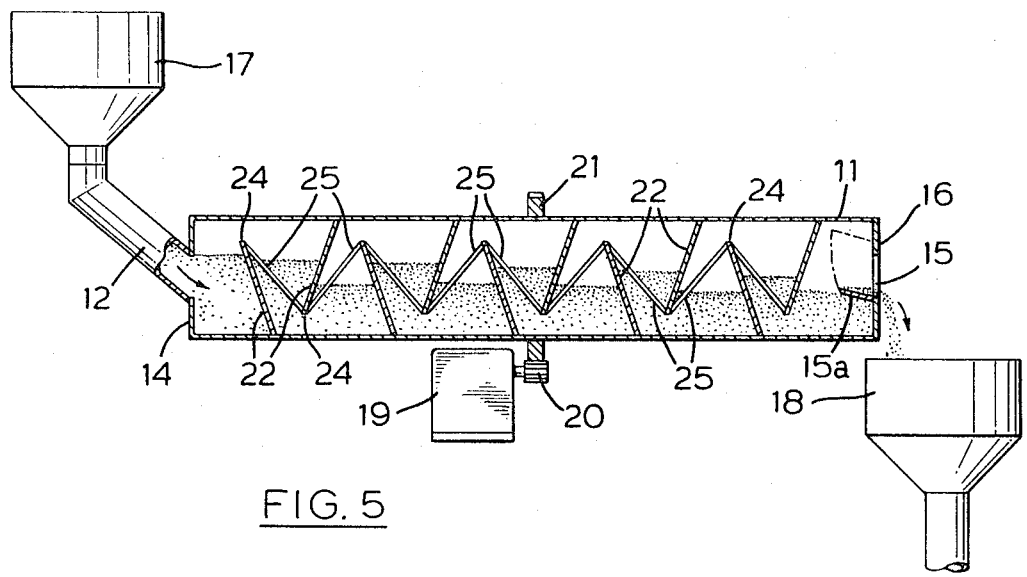

United States Patent

[11] 3,588,052

| [72] | Inventor | Myndert T. Scholtz<br>Scarborough, Ontario, Canada |
|---|---|---|
| [21] | Appl. No. | 770,622 |
| [22] | Filed | Oct. 25, 1968 |
| [45] | Patented | June 28, 1971 |
| [73] | Assignee | Toronto Coppersmithing Company Limited<br>Scarborough, Ontario, Canada |
| [32] | Priority | Nov. 16, 1967 |
| [33] | | Canada |
| [31] | | 005,224 |

[54] CONTINUOUS BLENDER
7 Claims, 6 Drawing Figs.

| [52] | U.S. Cl. | 259/3 |
|---|---|---|
| [51] | Int. Cl. | B01f 9/02 |
| [50] | Field of Search | 259/3, 4, 30, 57, 81, 88; 34/109 |

[56] References Cited

UNITED STATES PATENTS

| 2,660,807 | 12/1953 | Waish et al. | 259/3X |
| 3,381,944 | 5/1968 | Clary | 259/3 |

FOREIGN PATENTS

| 606,995 | 12/1934 | Germany | 259/3 |

*Primary Examiner*—Edward L. Roberts
*Attorney*—Rogers, Bereskin & Parr

ABSTRACT: A continuous blender for mixing material such as powder, granular material, etc., employing a generally horizontal cylindrical housing with an inlet at one end and an outlet at the opposite end. A series of spaced-apart baffles are positioned in the housing to form a series of wedge-shaped compartments, each baffle being cut to permit adjacent compartments to communicate with one another. As the housing is rotated, material is caused to pass from one compartment to another towards the outlet, and during its passage through the housing the material is continuously tumbled within each compartment.

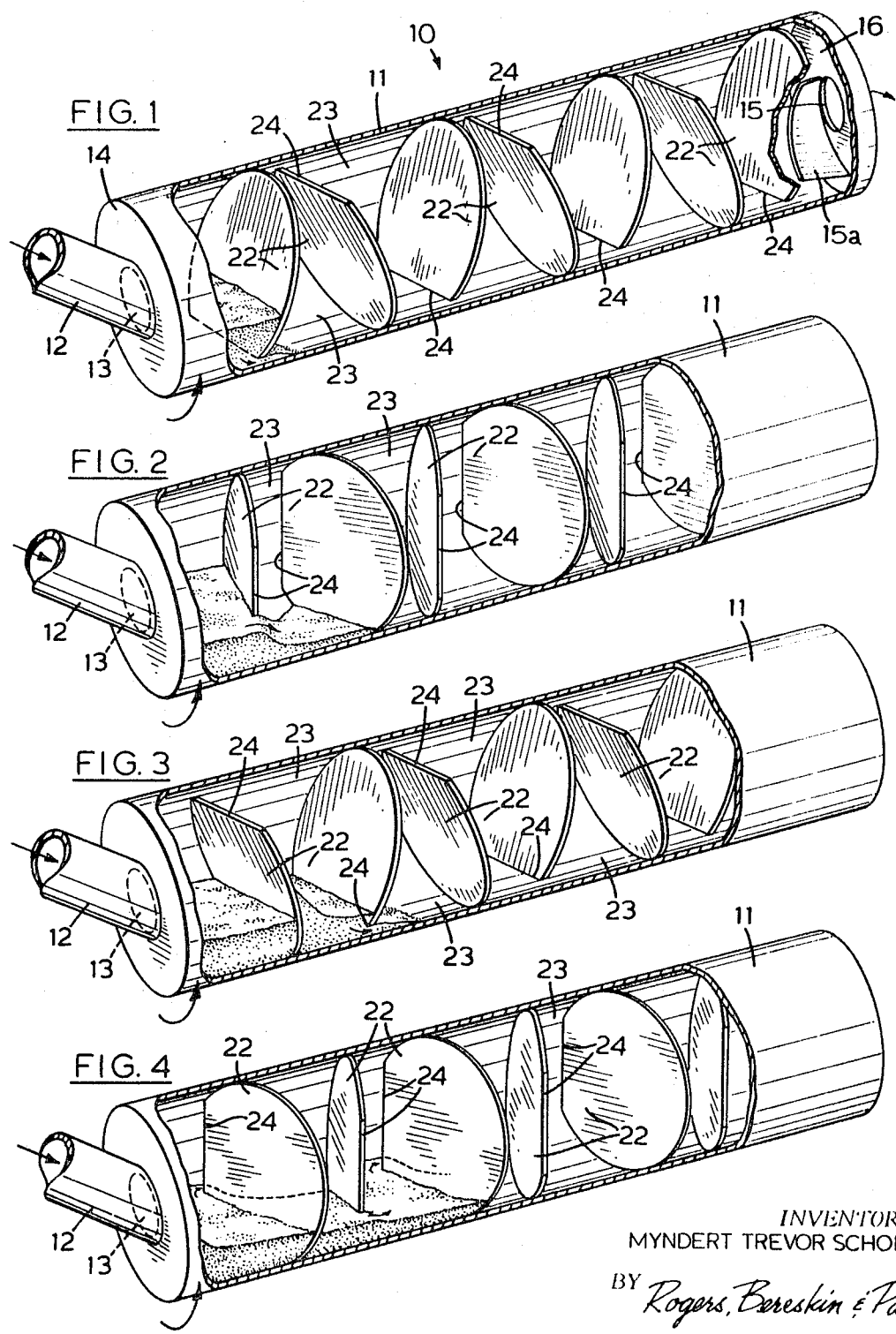

INVENTOR
MYNDERT TREVOR SCHOLTZ

BY Rogers, Bereskin, & Parr

CONTINUOUS BLENDER

This invention relates to a continuous blender for mixing materials such as dry, free flowing powders, wet powders, wet and dry granular material, semiliquid suspensions and the like.

According to the invention, materials to be mixed are fed into a rotatable, generally horizontal cylindrical housing having an inlet at one end and an outlet at its opposite end. A plurality of spaced-apart baffles is positioned in the housing adjacent to the inner wall thereof, and the baffles are disposed so as to form a series of wedge-shaped compartments. Each compartment is preferably in inverted relationship to each next adjacent compartment, and each baffle is cut to provide an opening between adjacent compartments. As the housing is rotated, material fed into the housing is caused to pass from one compartment to another towards the outlet of the housing, and while passing through the housing the material is continuously tumbled within each compartment. Due to the arrangement of the baffles, material in any given compartment continuously varies in level as the housing rotates, and the material in each compartment tends to tumble, pour or cascade over itself as the material is changing in level. Segregation of the material is reduced to a very low level, and mixing efficiency is high. In addition, the present blender features positive displacement so that the material can be carried forward even up an incline.

Figure 6:
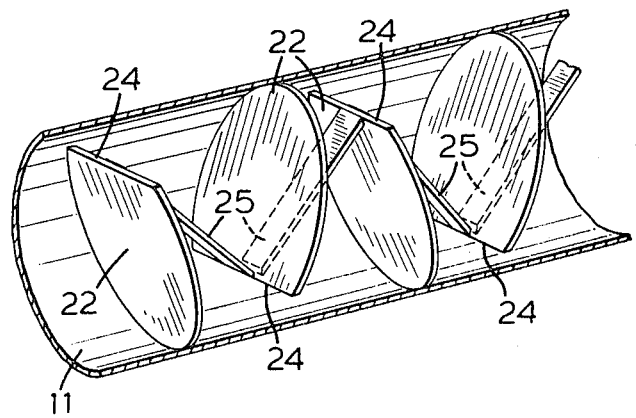

Preferred embodiments of the invention are disclosed in the accompanying drawings, wherein:

FIGS. 1, 2, 3 and 4 are perspective views, partly broken away, showing a blender in four different positions during a cycle of rotation, FIG. 5 is a side view, partly broken away, of another form of blender employing diagonal strips in each compartment, and FIG. 6 is a perspective view, partly broken away, of three compartments of the blender of FIG. 5.

Referring to the drawings, a continuous blender according to the invention is generally indicated by reference numeral 10, and it includes a hollow cylindrical housing 11 of preferably circular cross section. An inlet pipe 12 communicates with an opening 13 in an end wall 14 of the housing 11. An opening 15 which constitutes an outlet is formed in end wall 16 at the opposite end of the housing 11. A scoop 15a is secured to the end wall 16 adjacent the opening 15, and it tends to assist the discharge of material through the outlet 15. The inlet pipe 12 is connected to a feed hopper 17, and a chute 18 is positioned near the outlet of the blender 10 for receiving material discharged through the outlet. The blender 10 can be rotated by any conventional means, such as a motor 19 which drives a pinion gear 20 engaging a circumferential spur gear 21 fixed to the outer wall of the housing 11. FIGS. 1—4 show the blender 10 as it is being filled; in operation the blender 10 is usually between about 30°—60° percent full.

A plurality of equispaced elliptical baffles 22 is fixed to the inner wall of the housing 11. Each baffle 22 is generally transverse of the longitudinal axis of the housing 11, and adjacent baffles 22 are inclined so that they form a series of wedge-shaped compartments 23. The angle between the baffles 22 and the longitudinal axis of the housing 11 is preferably about 70°, although the exact angle is not very critical. Each baffle 22 has a cut edge 24 which provides an opening between adjacent compartments 23 to permit material to pass therethrough. The cut edge 24 of any given baffle 22 is preferably diametrically opposite the cut edge 24 of each next adjacent baffle 22. Accordingly, each compartment 23 can be considered to be angularly rotated through an angle of 180° with respect to adjacent compartments 23 (i.e. they are in inverted relationship to one another). In addition, the cut edge 24 of each baffle 22 is located opposite to the closest extremity of the next preceding baffle, and the cut edge 24 of the baffle nearest the inlet 13 is located at the closest extremity of this baffle to the adjacent end wall of the housing. However, it is contemplated that the compartments 23 can be progressively angularly rotated from input to output through smaller angles as well, such as 90° and 45°, for example.

In operation, material fed into the feed hopper 17 falls by gravity through the opening 13 into a first compartment 23 which is constituted by the end wall 14 and the adjacent baffle 22. In FIGS. 1—4, the first compartment 23 is at the left-hand end of the housing 11; adjacent compartments 23 are respectively referred to below as second, third, etc. Assuming there is a quantity of material in the first compartment 23, rotation of the housing 11 causes a portion of the material in the first compartment 23 to discharge into the second compartment 23, as shown in FIGS. 1 and 2. As the housing 11 is rotated further, the level of the bed of material in the second compartment eventually becomes higher than the level of the material in the first compartment, and material discharges from the second compartment into the third compartment 23 (see FIG. 3).

The tendency is for virtually all the material to proceed towards the outlet as it is being tumbled. Further rotation of the housing 11 causes the levels in the first and third compartments to rise to a point where they are higher than the level in the second compartment, whereupon further rotation causes additional material from the first compartment to flow into the second compartment, and material from the third compartment to flow into the fourth compartment. In this manner material is passed from one compartment to another towards the outlet of the housing 11. Another feature of this arrangement is that it is not possible for any material to "short circuit" the blender (i.e. to pass from inlet to outlet without being mixed).

As a result of the geometry of the compartments 23 the level of the material in each compartment continuously changes with the rotation of the housing 11, and the mixing action of the blender is comparatively gentle as the material tends to gently tumble, pour or cascade over itself as it is changing level. This action reduces segregation of the material to a very low level. In addition, the gentle tumbling action is particularly advantageous in mixing comparatively fragile crystalline granules.

The speed of rotation of the housing 11 is generally between about 3 and 60 r.p.m., depending upon the material being mixed and the size of the housing 11. In general, the speed should be such that the material is caused to tumble or cascade. If the speed is too great, the material tends to adhere to the inner wall of the housing by centrifugal force, and this of course is undesirable.

As indicated above, the movement of the material through the blender is positive, so that the material can be conveyed up or down a moderate incline as well as horizontally. If the longitudinal axis is inclined so that the outlet is higher than the inlet the feed rate through the blender will be reduced, and vice versa.

In FIGS. 5 and 6 a plurality of diagonal strips 25 are shown extending between the midpoints of the cut edges 24 of the adjacent baffles 22. Although these strips 25 are optional, in some cases they have been found to slightly improve the mixing action of the blender. Instead of positioning the strips 25 at the midpoints of the cut edges 24, the strips 25 can be moved to other points along the peripheral edges of the baffles 22 until an optimum position is found (e.g. from one end of a cut edge 24 of one baffle 22 to the opposite end of the cut edge 24 of the opposite baffle 22). This is best done with a model having a transparent housing so that the mixing action can most easily be observed.

Although experimental work carried out to date does not establish any particular advantage for a housing having a cross section other than circular, it has been found that a blender having a housing of square cross section performs in much the same manner as one of circular cross section. A circular housing is much easier to rotate and is therefore preferred, but a housing of square cross section may have advantages in particular cases. Tests may be carried out with housings of various cross section, as mentioned below, in order to determine the optimum configuration for any particular materials and blender size. Similarly, while the baffles 22 have been shown as flat, it is contemplated that the baffles 22 may be moderately curved if it appears that any gain in mixing efficiency would thereby result.

In a prototype of comparatively small size, the diameter of the housing 11 was 12 inches, and the length was about 7 feet. It was found that the number of baffles was not especially critical; excellent results were obtained with between 13–16 baffles, and the prototype performed reasonably efficiently with only seven baffles. The openings between adjacent compartments 23 (constituted by the cut edges 24 of the baffles 22 and adjacent portions of the inner wall of the housing 11) were of various sizes in the range between about 3 inches—4-178 inches, measured along the major axis of each baffle 22. In general, the effect of varying any of the dimensions or other specifications of the blender (such as the number of baffles, etc.) is best determined by producing a model, preferably with a transparent housing, and making quantitative measurements of the ratio by weight of the materials after they have passed through the blender, and at the same time observing the nature of the mixing action in the compartments 23 to ensure that the material is being tumbled or poured over itself in each compartment to an optimum degree. It was also found that the prototype was very efficient in emptying itself; i.e. after the flow of material into the blender was stopped, the blender emptied itself almost completely within a short time.

I claim:
1. A continuous blender for mixing materials comprising:
   a. an elongated rotatable housing having a longitudinal axis, said housing having an inlet at one end for receiving material to be mixed and an outlet at the opposite end for discharging the material after it has passed through the housing, and
   b. a plurality of inclined baffles positioned in the housing with a substantial portion of the periphery of the baffles contiguous with the inner wall of the housing, adjacent baffles being disposed generally transversely of the longitudinal axis of the housing so as to form a series of wedge-shaped compartments, each of said compartments being defined by opposite walls of two adjacent baffles and the portion of the inner wall of said housing between said two baffles, said compartments being in progressively angularly rotated relationship with one another, each baffle having a cut edge which provides a space between the baffle and the adjacent inner wall of the housing, said baffles being positioned so that the respective cut edges of adjacent baffles are angularly displaced with respect to each other and each cut edge of each baffle is spaced from the next preceding baffle by a predetermined distance to thereby provide an opening between adjacent compartments so that material is permitted to pass therethrough, whereby as said housing is rotated, material fed into the housing passes from one compartment to another towards the outlet and is continuously tumbled in each compartment.

2. A continuous blender as claimed in claim 1 wherein each compartment is in inverted relationship to each next adjacent compartment.

3. A continuous blender as claimed in claim 2 wherein the housing is circular and the baffles are elliptical.

4. A continuous blender as claimed in claim 3 wherein the baffles are disposed at an angle of about 70° relative to the longitudinal axis of the housing.

5. A continuous blender as claimed in claim 1 including means for rotating the housing.

6. A continuous blender as claimed in claim 1 wherein a narrow diagonal strip is provided in each of said compartments, said strips extending between the cut edges of adjacent baffles.

7. A continuous blender as claimed in claim 1 wherein the cut edge of each baffle is located opposite to the closest extremity of the next preceding baffle, and the cut edge of the baffle nearest the inlet is located at the closest extremity of said nearest baffle to said one end.